(12) United States Patent
Diachina et al.

(10) Patent No.: US 7,177,299 B2
(45) Date of Patent: Feb. 13, 2007

(54) WIRELESS COMMUNICATIONS APPARATUS, METHODS AND COMPUTER PROGRAM PRODUCTS USING BROADCAST CONTROL CHANNEL MESSAGING

(75) Inventors: John Diachina, Garner, NC (US); Hans Carlsson, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 1125 days.

(21) Appl. No.: 10/128,846

(22) Filed: Apr. 24, 2002

(65) Prior Publication Data

US 2004/0202143 A1 Oct. 14, 2004

(51) Int. Cl.
*H04T 3/24* (2006.01)
(52) U.S. Cl. .................. 370/349; 370/329; 370/341
(58) Field of Classification Search ........ 370/352–356, 370/338, 349, 329, 341, 431
See application file for complete search history.

(56) References Cited

U.S. PATENT DOCUMENTS

| | | | |
|---|---|---|---|
| 5,404,355 A | 4/1995 | Raith | 370/95.1 |
| 5,982,761 A | 11/1999 | Dutta | 370/337 |
| 6,266,343 B1* | 7/2001 | Caves | 370/466 |
| 6,414,945 B1* | 7/2002 | Chennakeshu et al. | 370/317 |
| 6,477,377 B2* | 11/2002 | Backstrom et al. | 455/446 |
| 6,622,251 B1* | 9/2003 | Lindskog et al. | 713/300 |
| 6,885,862 B1* | 4/2005 | Pearson | 455/419 |
| 2003/0174686 A1* | 9/2003 | Wilenegger et al. | 370/342 |
| 2003/0189947 A1* | 10/2003 | Beshai | 370/428 |

FOREIGN PATENT DOCUMENTS

WO WO 00/24214 4/2000

OTHER PUBLICATIONS

*Scheduling of System Information*, TSG-RAN Working Group 2, Online, Aug. 1999, XP002245811 Retrieved from the Internet: http://www.3gpp.org/ftp/tsg_ran/WG2_RL2/TSGR2_06/Docs/Pdfs/r2-99810.pdf; retrieved on Jun. 20, 2003; the whole document.
PCT International Search Report; PCT/US 03/08419; Mar. 19, 2003.

(Continued)

*Primary Examiner*—Ajit Patel
(74) *Attorney, Agent, or Firm*—Myers Bigel Sibley & Sajovec, PA

(57) ABSTRACT

First and second classes of broadcast information, which have different repetitive rates, are transmitted in repetitive shared blocks of a Packet Broadcast Control Channel (PB-CCH) of a General Packet Radio Service (GPRS) wireless communications system. The first class of broadcast information may be transmitted at a higher repetition rate in the shared blocks of the PBCCH than the second class of broadcast information. The same sequence of broadcast information of the first class may be transmitted in each instance of a shared block of the PBCCH along with successive portions of the broadcast information of the second class. The shared blocks may be evenly spaced apart within the PBCCH.

52 Claims, 3 Drawing Sheets

OTHER PUBLICATIONS

3GPP TS 45.002, V4.5.0 (Nov. 2001), Technical Specification, 3rd Generation Partnership Project; Technical Specification Group GSM/EDGE Radio Access Network; Multiplexing and Multiple Access on the Radio Path (Release 4); 2001; pp. 1-8 and pp. 22-59 (Section 6).

3GPP TS 44.060, V4.4.0 (Dec. 2001), Technical Report, 3rd Generation Partnership Project; Technical Specification Group GSM EDGE Radio Access Network; General Packet Radio Service (GPRS); Mobile Station (MS)—Base Station System (BSS) Interface; Radio Link Control/Medium Access Control (RLC/MAC) Protocol (Release 4); 2001; pp. 1-17, pp. 118-119 (Section 10.2), and pp. 133-269 (Section 11).

* cited by examiner

WIRELESS COMMUNICATIONS APPARATUS, METHODS AND COMPUTER PROGRAM PRODUCTS USING BROADCAST CONTROL CHANNEL MESSAGING

BACKGROUND OF THE INVENTION

The present invention relates to wireless communications apparatus, methods and computer program products, and more particularly, to apparatus, methods and computer program products for communicating messages in a wireless communications system.

There is an ever-present demand for new types of services in wireless data communications systems, such as the GSM-based General Packet Radio System (GPRS). As such systems have evolved to provide new services, the volume and variety of information communicated to terminals has generally increased. It is generally desirable that such information be provided in a timely and bandwidth-efficient manner.

SUMMARY OF THE INVENTION

According to some embodiments of the present invention, first and second classes of broadcast information having different repetition rates, are transmitted in repetitive shared blocks of a Packet Broadcast Control Channel (PBCCH) of a General Packet Radio Service (GPRS) wireless communications system. For example, according to some embodiments of the present invention, a full set of first class broadcast information may be transmitted at a higher repetition rate in the shared blocks of the PBCCH than the second class of broadcast information. The same sequence of broadcast information of the first class may be transmitted in each instance of the shed blocks of the PBCCH along with successive portions of the sequence of broadcast information of the second class.

In this manner, system messages within the first class may be received by a wireless terminal with less delay than messages within the second class. Reduced delay in the reception of the PSI messages may result in a user perceiving less service interruption during operations such as the re-selection of a cell and may improve overall system operation and efficiency.

The present invention may be embodied as apparatus, such as base stations, wireless terminals, circuit modules, and Application Specific Integrated Circuits (ASICs). The present invention may also be embodied as methods and computer program products.

DETAILED DESCRIPTION

The present invention will now be described more fully with reference to the accompanying drawings, in which typical embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to embodiments of the present invention, wireless mobile packet data communications systems, methods and computer program products may be provided. Many of the embodiments of the present invention described herein relate to provision of Very High Repetition (VHR) broadcast control messages on a Packet Broadcast Control Channel (PBCCH) of a General Packet Radio Service (GPRS) system (see 3rd Generation Partnership Project (3GPP) TS 44.060 and 45.002), but it will be appreciated that the present invention is applicable to other types of communication systems in the cellular industry.

Figure 1:
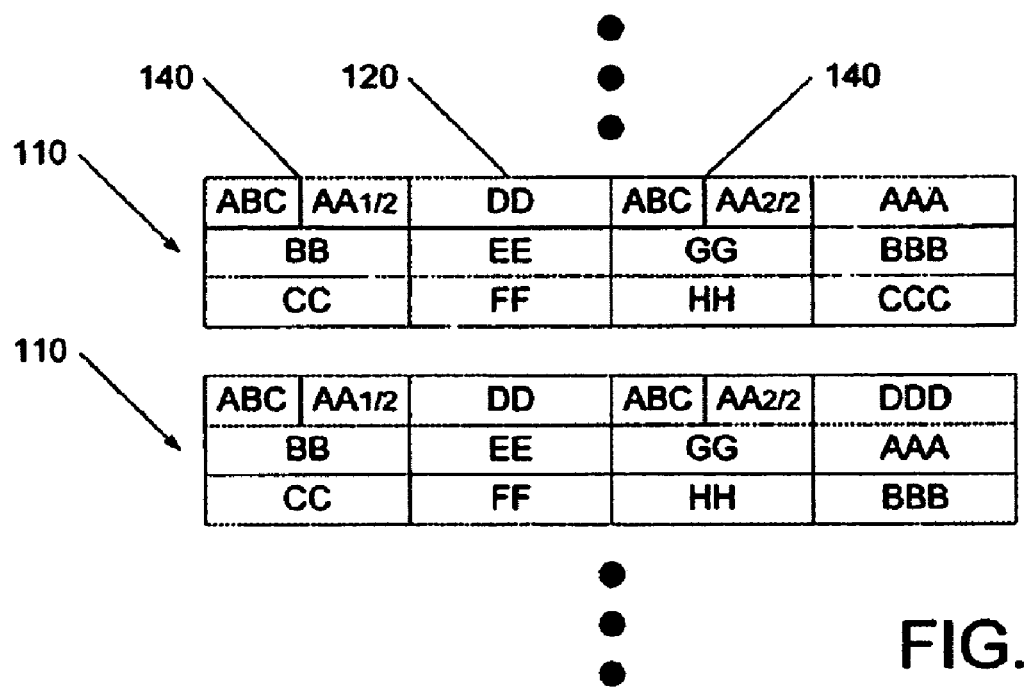
FIG. 1 illustrates exemplary timing relationships among broadcast messages according to some embodiments of the present invention.
Figure 2:
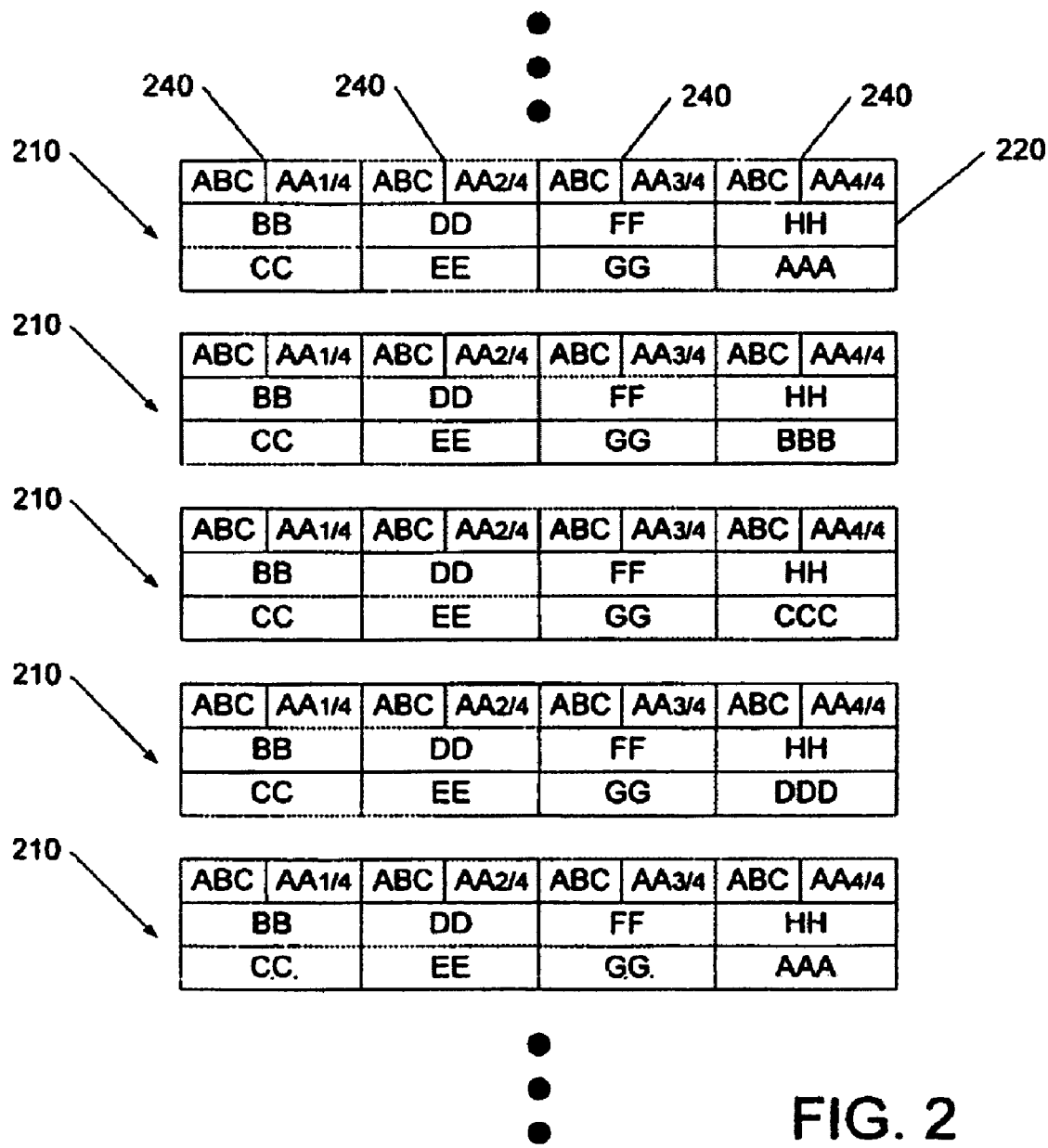
FIG. 2 illustrates exemplary timing relationships among broadcast messages according to further embodiments of the present invention.
Figure 3:
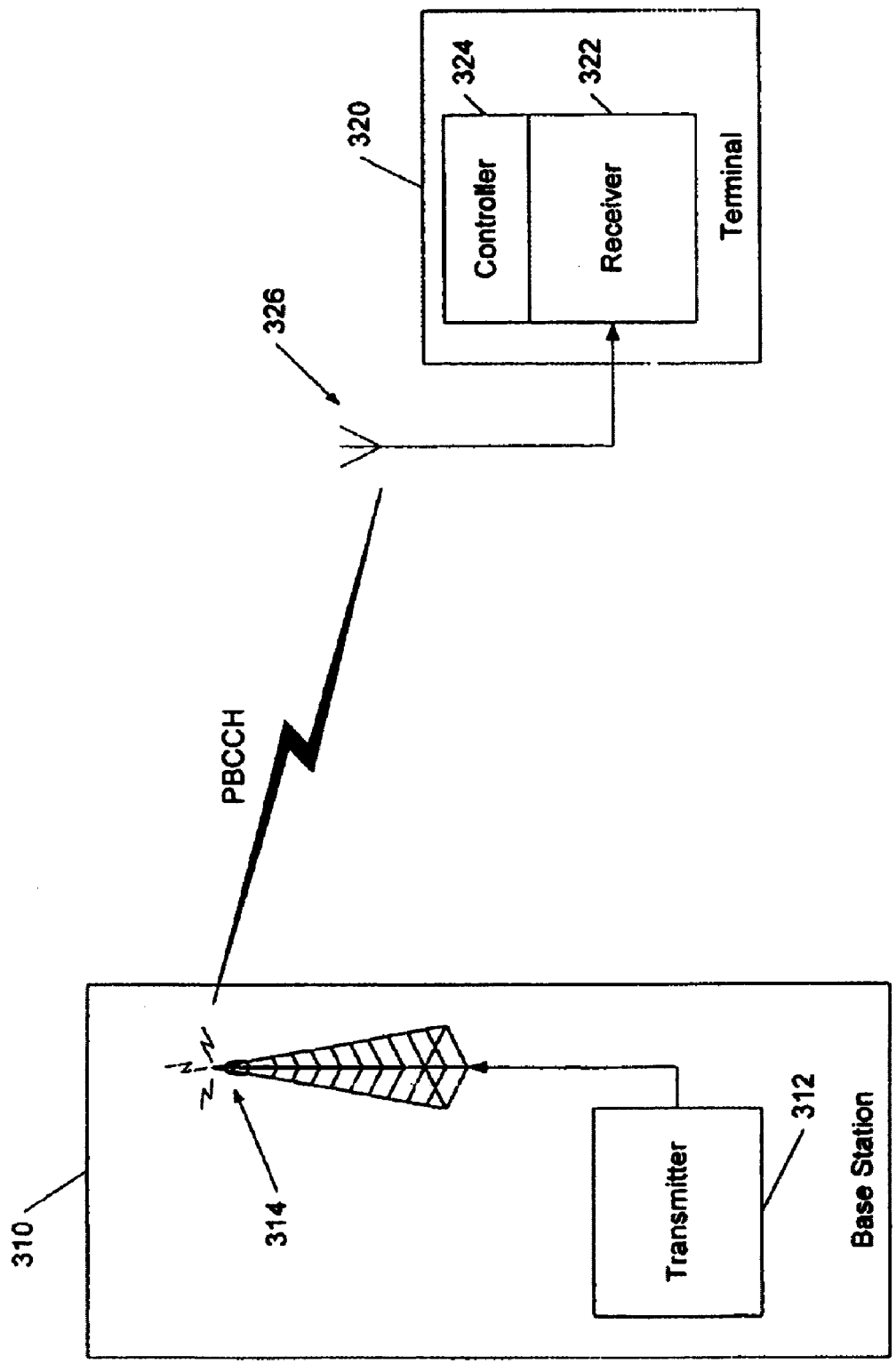
FIG. 3 illustrates wireless apparatus and operations according to some embodiments of the present invention.

In the present application, FIGS. 1–3 are diagrams illustrating exemplary apparatus and operations according to embodiments of the present invention. It will be understood that operations depicted in the diagrams, and combinations thereof, may be implemented using one or more electronic circuits, such as circuits included in a component of a wireless communications system or in a wireless terminal. It will also be appreciated that, in general, operations depicted in the diagrams, and combinations thereof, may be implemented in one or more electronic circuits, such as in one or more discrete electronic components, one or more integrated circuits (ICs) and/or one or more application specific integrated circuits (ASICs) and/or application specific circuit modules, as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the specified operations. The computer program instructions may also be executed on one or more computers or other data processing apparatus to cause a series of operations to be performed on the computer(s) or other programmable apparatus to produce a computer implemented process that includes the specified operations.

The computer program instructions may also be embodied in the form of a computer program product in a computer-readable storage medium, i.e., as computer-readable program code embodied in the medium for use by or in connection with an instruction execution system. The computer-readable storage medium may include, but is not limited to, electronic, magnetic, optical or other storage media, such as a magnetic or optical disk or an integrated circuit memory device. For example, the computer program instructions may be embodied in memory included in a component of a wireless communications apparatus and/or storage medium operable to program such memory. Accordingly, blocks of FIGS. 1–3 support electronic circuits and other apparatus that perform the specified operations, acts for performing the specified operations, and computer program products configured to perform the specified operations.

In a conventional GPRS system, messages broadcast on the Packet Broadcast Control Channel (PBCCH) are called Packet System Information (PSI) messages. Conventional GPRS systems support two basic repetition rates for PSI messages—High Repetition (HR) and Low Repetition (LR). It is generally a configuration option of the system to determine which particular PSI messages will be sent as HR class messages and which ones will be sent as LR class messages, i.e., other than a few exceptions, the GPRS standard does not prescribe which messages should be sent as HR class messages and which ones should be sent as LR class messages. In some conventional GPRS systems, the GPRS LR data rate is about 75 bits/sec and the GPRS HR data rate is about 150 bits/sec. A full sequence of HR class PSI messages are transmitted using groups of four consecutive instances of a given time slot, called PBCCH blocks. The group of PBCCH blocks used to transmit the full sequence of HR class PSI messages is a part of an overall sequence of PBCCH blocks which span a variable number of 52-multiframes determined by the repetition period, PSI1_REPEAT_PERIOD (see3GPP TS 44.060). Once a full-sequence of HR class PSI messages has been transmitted using PBCCH blocks available within a PSI1_REPEAT_PERIOD, the full-sequence of HR class PSI messages is repeated starting in the next PSI1_REPEAT_PERIOD. Once a full set of HR class PSI messages has been sent using the first and subsequent consecutive PBCCH blocks as necessary within the overall sequence of PBCCH blocks transmitted within the PSI1_REPEAT_PERIOD, the remaining PBCCH blocks are used to send a portion of the set of LR class PSI messages. Note that in current practice it typically takes more than one PSI1_REPEAT_PERIOD to send a full set of LR class PSI messages.

One limitation with existing HR class PSI messages is that they may not adequately support the transmission of new information needing significantly shorter transmission intervals. For example, some broadcast information which is used by a mobile terminal upon initial selection of a cell or upon performing a cell re-selection can be considered particularly time-critical or urgent. Delay of this information can potentially result in a user perceiving a noticeable delay in a mobile terminal gaining initial access to the system or can result in excessive service interruptions upon cell re-selection. A basic amount of service delay is introduced as a result of the system selecting the fixed periodicity used for sending HR or LR class PSI messages to the mobile terminal. Further service delay can be introduced when at least some of the information sent within any given PSI1_REPEAT_PERIOD is incorrectly received by the mobile terminal and the information must be read again (at least once more) before it is correctly received.

According to one aspect of the invention, a new Very High Repetition (VHR) class of broadcast control channel message is provided, appropriate for supporting the broadcast of information that requires a more real time transmission rate than that currently provided for by HR PSI messages. The VHR PSI messages are transmitted at a higher repetition rate than conventional HR PSI messages and are sent using shared PBCCH blocks which are part of the overall sequence of PBCCH blocks sent within a PSI1_REPEAT_PERIOD. Each instance of VHR PSI message sent may contain a VHR payload portion and an HR payload portion. The VHR payload portion may include all broadcast information requiring VHR treatment and is repeated in its entirety within each instance of a VHR PSI message. The HR payload portion may include of some portion of the broadcast information requiring HR treatment and as such is therefore typically sent only once during the PSI1_REPEAT_PERIOD. A sequence of multiple VHR PSI messages may be transmitted within a PSI1_REPEAT_PERIOD to reduce the time required for a mobile terminal to receive the complete VHR payload carried within each instance of a VHR PSI message. For example, a GPRS system may be configured, according to embodiments of the present invention, to transmit VHR payload information carried within each instance of a VHR PSI messages at 2 or more times the rate at which HR payload information is transmitted within a full sequence of HR PSI messages sent each PSI1_REPEAT_PERIOD.

According to another aspect of the invention, the shared PBCCH blocks are spread out relatively evenly within the overall set of PBCCH blocks sent during the PSI1_REPEAT_PERIOD to, for example, reduce the average delay in mobile terminal acquisition of VHR payload carried within each instance of a VHR PSI message.

An exemplary VHR PSI message format for a GPRS application according to some embodiments of the present invention is as follows:

Octet 1: Message Type (6 bits)+Page Mode (2 bits)
    Message Type—coded using a currently undefined PSI message type.
    Page Mode—coded as per existing PSI messages.
Octet 2: VHR Message Octet Count (4 bits)+VHR Message Instance Count (2 bits)+VHR Message Index (2 bits)
    VHR Message Octet Count—indicates how many octets immediately following Octet 2 contain VHR message information and is coded as follows:
        0000=1 octet (1 octet of VHR payload information is present, N=3)
        0001=2 octets (2 octets of VHR payload information is present, N=4)
        0010=3 octets (3 octets of VHR payload information is present, N=5)
        . . .
        1111=16 octets (16 octets of VHR payload information is present, N=18)
    VHR Message Instance Count—indicates how many instances of VHR PSI messages are included within the overall set of PSI messages sent during a single PSI1_REPEAT_PERIOD and is coded as follows:
        00=1 instance per PSI1_REPEAT_PERIOD
        01=2 instances per PSI1_REPEAT_PERIOD
        10=3 instances per PSI1_REPEAT_PERIOD
        11=4 instances per PSI1_REPEAT_PERIOD
    VHR Message Index—indicates the instance of the current VHR PSI message within the set of VHR PSI messages sent within the overall set of PSI messages sent during a single PSI1_REPEAT_PERIOD and is coded as follows:
        00=Instance 1
        01=Instance 2
        10=Instance 3
        11=Instance 4
Octet 3 to N: VHR Message Information
    For any instance of a VHR PSI message sent where a complete set of VHR information elements (i.e. complete payload information) must be present.
    An-upper limit of 16 octets for a complete set of VHR information elements is imposed by the current solution.
    A complete set of VHR information elements can therefore be provided as often as 4 times within the time required for 1 cycle of HR messages.
Octet N+1 to 22: HR Information
    All octets following the VHR payload portion of a VHR PSI message shall be used for HR payload which means that a minimum of 4 octets of HR payload space is available within each instance of a VHR PSI message.
    If multiple instances of the VHR PSI message are sent within the overall set of PSI messages sent during a single PSI1_REPEAT_PERIOD then each instance will contain a portion of the full set of HR payload information requiring transmission (i.e. the HR payload included within a VHR PSI message is typically sent once within the overall set of HR PSI messages sent during a single PSI1_REPEAT_PERIOD). Each instance of a VHR PSI message sent during any given PSI1_REPEAT_PERIOD can therefore be logically viewed as carrying a VHR sub-message (entirely repeated within each VHR PSI message) and an HR sub-message that is unique to each instance of VHR PSI message sent during the PSI1_REPEAT_PERIOD. The HR sub-message is transmitted using the octets not used by the VHR sub-message.

The HR payload space available within any given instance of a VHR PSI message may not all be used to carry HR payload. In this case the remaining octets of HR payload space are padded with an appropriate filler pattern.

To facilitate the operation of the mobile terminal, the GPRS system transmits certain types of PSI messages in specific multiframes and specific PBCCH blocks within the multiframes as described below and with reference to Table 2. The parameter PSI_COUNT_HR (range 1 to 16) is included in the conventional GPRS PSI1 message and indicates how many PBCCH blocks in the overall set of PBCCH blocks sent during the PSI1_REPEAT_PERIOD are to be treated as HR PSI messages (See Table 4, rows "0–4 (B0)"–"0–4 (B6)" columns "TC=0"–"TC=2" and row "0–4 (B9)" column "TC=0"–"TC=1"). As such, if one or more instances of a VHR PSI message is to be sent within the portion of PBCCH blocks assigned for HR PSI message space, then each of these VHR PSI messages are counted by the system when determining the value of PSI_COUNT_HR to broadcast. Each instance of a VHR PSI message sent in HR PSI message space is allocated a unique message type in order for mobile terminals to count the correct number of HR PSI messages. Legacy mobile terminals will not understand these new VHR PSI messages but will still count them in order to determine when HR PSI message space ends and LR PSI message space begins within the overall set of PBCCH blocks sent during a PSI1_REPEAT_PERIOD.

The parameter PSI_COUNT_LR indicates how many LR PSI messages comprise a full cycle of LR PSI messages. Each instance of a VHR PSI message that is sent in LR PSI message space and is part of the overall sequence of PBCCH blocks spanning a single cycle of LR PSI messages is counted by the system when determining the value of PSI_COUNT_LR to broadcast. Note that a single cycle of LR PSI messages may span multiple PSI1_REPEAT_PERIODs. As such, each VHR PSI message sent within a single cycle of LR PSI messages is allocated a unique message type in order for mobile terminals to count the correct number of LR PSI messages (See Table 4, rows "0–4 (B0)"–"0–4 (B6)" columns "TC=3"–"TC=4", row "0–4 (B9)" columns "TC=2"–"TC=4", rows "5–9 (B0)"–"5–9 (B6)" columns "TC=3"–"TC=4", row "5–9 (B9)" columns "TC=2"–"TC=3"). Legacy mobile terminals will not understand these new VHR PSI messages but will still count them in order to determine when a complete set of LR PSI messages has been received.

The total number of VHR PSI messages present with in the overall set of PBCCH blocks sent during a single PSI1_REPEAT_PERIOD shall be determined by the system. Once determined, the quantity and location of these VHR PSI messages shall remain constant within the overall set of PBCCH blocks sent in subsequent PSI1_REPEAT_PERIODs unless re-configured by the system.

The PBCCH information transmitted includes values for BS_PBCCH_BLKS and PSI1_REPEAT_PERIOD which are selected by the GPRS system such that all PSI messages can be transmitted according to Table 2 below.

TABLE 2

New Rules for Mapping of PBCCH Information

| Message | Transmission Requirement | Transmission Conditions |
|---|---|---|
| PSI 1 | Required | Sent in B0 when TC = 0. Sent in B6 when TC = 0 if the value of the parameter BS_PBCCH_BLKS is greater than 1. |
| HR | Optional | Sent in a sequence determined by the GPRS system. Includes PSI messages to be sent at high repetition and very high repetition rates. Sent starting at TC = 0, using the PBCCH blocks within each 52-multiframe, in the order of their occurrence, which are not occupied by PSI 1. The full sequence of HR PSI messages are repeated starting at each occurrence of TC = 0. VHR PSI messages are a special case of PSI messages that can be sent within the HR PSI message space portion of the overall set of PBCCH blocks sent during the PSI1_REPEAT_PERIOD. |
| LR | Optional | Sent in a sequence determined by the GPRS system. These messages are continuously repeated, using the PBCCH blocks within each 52-multiframe, in the order of their occurrence, in time blocks which are not occupied by PSI 1, HR PSI or VHR PSI messages. Within any HR cycle (determined by PSI1_REPEAT_PERIOD) the GPRS system only sends an LR message once it has transmitted a full cycle of all PSI messages that are to be sent at high repetition rates. VHR PSI messages are a special case of PSI messages that can be sent within the LR PSI message space |

TABLE 2-continued

New Rules for Mapping of PBCCH Information

| Message | Transmission Requirement | Transmission Conditions |
|---|---|---|
| | | portion of the overall set of PBCCH blocks sent during the PSI1_REPEAT_PERIOD. The full sequence of LR PSI messages are repeated starting at each occurrence of FN = 0. |

VHR PSI messages are scheduled for transmission so that the shared PBCCH blocks they occupy are spaced out relatively evenly across all PBCCH blocks sent during a PSI1_REPEAT_PERIOD (i.e. each instance of a VHR PSI message occurs with nearly equal spacing in time). With nearly equal spacing, the delay associated with the mobile terminal acquiring the VHR payload portion of a VHR PSI message for the case when any given VHR PSI message is not properly received, is reduced.

An example of a GPRS system according to embodiments of the present invention is provided below to demonstrate how VHR PSI messages can be integrated with the scheduling and transmission of conventional HR PSI and LR PSI messages for third-generation (3G) systems:

Time Slot Configuration:
  One timeslot=3/5200 seconds (about 577 microSec).
  Eight timeslots=1 TDMA frame=24/5200 seconds (about 4.62 ms).
  A single 52-multiframe=52 TDMA frames=1248/5200 seconds=240 ms.
  Each PSI message is sent using a PBCCH block (i.e. four consecutive instances of any given timeslot) within a 52-multiframe.

Message Configuration:
  The sequence of PSI messages to be sent on the PBCCH along with their associated target transmission period is as indicated in Table 3 below.

PSI1_REPEAT_PERIOD=5 which results in TC=(FN DIV 52) mod 5.

BS_PBCCH_BLKS=4 which results in each 52-multiframe providing 4 PBCCH blocks (i.e. B0, B3, B6 and B9).

VHR Message Count=3 (i.e. 3 instances of the VHR PSI message per HR cycle). In this example two of these VHR PSI messages are sent within HR PSI message space (See Table 4, rows "0–4 (B0)"–"0–4 (B6)" columns "TC=0"–"TC=2" and row "0–4 (B9)" column "TC=0"–"TC=1") and one VHR message is sent with LR PSI message space.

PSI_COUNT_HR=11 (i.e. the first 11 PBCCH blocks in the overall set of PBCCH blocks sent during the PSI1_REPEAT_PERIOD are considered as HR PSI messages by a mobile terminal regardless of whether or not it understands the associated message type or even if it receives BCS correct messages in these PBCCH blocks).

PSI_COUNT_LR=17 (i.e. a mobile terminal must receive 17 different BCS correct LR PSI messages, regardless of whether or not it understands their associated message types, in order to determine that it has acquired a full set of LR PSI messages).

TABLE 3

Summary of PSI Messages

| Message | Transmission Requirement | Transmission Conditions |
|---|---|---|
| PSI 1 | Required | Sent in B0 when TC = 0<br>Sent in B6 when TC = 0 if the value of the parameter BS_PBCCH_BLKS is greater than 1 |
| PSI 2 | Required - 2 instances included | Periodicity target = 1 second (HR) |
| PSI 3 | Required - 1 instance included | Periodicity target = 1 second (HR) |
| PSI 3bis | Required - 14 instances included | Periodicity target = LR |
| PSI 3ter | Optional - 1 instance included | Periodicity target = 1 second (HR) |
| PSI 3quater | Optional - 1 instance included | Periodicity target = 1 second (HR) |
| PSI 4 | Optional - 1 instance included | Periodicity target = 1 second (HR) |
| PSI 5 | Optional 1 instance included | Periodicity target = 1 second (HR) |
| PSI 6 | Not Required | |
| PSI 7 | Not Required | |
| PSI 8 | Optional - 1 instance included | Periodicity target = LR |

TABLE 3-continued

Summary of PSI Messages

| Message | Transmission Requirement | Transmission Conditions |
|---|---|---|
| PSI 13 | Optional - NA | NA - not sent on PBCCH |
| PSI 14 | Optional - NA | NA - not sent on PBCCH |
| PSI 15 | Optional - NA | NA - not sent on PBCCH |
| VHR PSI | Optional - 3 instances included | Periodicity target = 1 second (HR) |

Table 4 below provides an indication of how, for this example, the transmitted PSI messages can be mapped onto the overall set of PBCCH blocks sent during the PSI1_REPEAT_PERIOD. To minimize the time required by an mobile terminal to acquire VHR payload information, 3 instances of VHR PSI messages are included within the overall set of PBCCH blocks sent during the PSI1_REPEAT_PERIOD and they are spaced about evenly. In this example a full set of HR PSI messages is sent every 5 multiframes (=1.2 seconds) and a full set of LR PSI messages is sent every multiframes (=2.4 seconds). This includes the transmission of 3 VHR PSI messages so that complete VHR payload is repeated about once every 400 ms.

TABLE 4

PBCCH B0, B3, B6 and B9 Utilization

| Instance of 52-multi-frame | TC = 0 | TC = 1 | TC = 2 | TC = 3 | TC = 4 |
|---|---|---|---|---|---|
| 0–4 (B0) | PSI 1 | PSI 2-2 | PSI 4 | PSI 3bis - 2 | PSI 3bis - 6 |
| 0–4 (B3) | PIS 2-1 | PSI 3 | PSI 5 | PSI 3bis - 3 | VHR PSI - 3 |
| 0–4 (B6) | PSI 1 | PSI 3ter | VHR PSI - 2 | PSI 3bis - 4 | PSI 3bis - 7 |
| 0–4 (B9) | VHR PSI - 1 | PSI 3quater | PSI 3bis - 1 | PSI 3bis - 5 | PSI 3bis - 8 |
| 5–9 (B0) | PSI 1 | PSI 2 - 2 | PSI 4 | PSI 3bis - 10 | PSI 3bis - 14 |
| 5–9 (B3) | PSI 2 - 1 | PSI 3 | PSI 5 | PSI 3bis - 11 | VHR PSI - 3 |
| 5–9 (B6) | PSI 1 | PSI 3ter | VHR PSI - 2 | PSI 3bis - 12 | PSI 8 |
| 5–9 (B9) | VHR PSI - 1 | PSI 3quater | PSI 3bis - 9 | PSI 3bis - 13 | PSI 3bis - 1 |
| 10–14 (B0) | PSI 1 | PSI 2 - 2 | PSI 4 | PSI 3bis - 3 | PSI 3bis - 7 |
| 10–14 (B3) | PSI 2 - 1 | PSI 3 | PSI 5 | PSI 3bis - 4 | VHR PSI - 3 |
| 10–14 (B6) | PSI 1 | PSI 3ter | VHR PSI - 2 | PSI 3bis - 5 | PSI 3bis - 8 |
| 10–14 (B9) | VHR PSI - 1 | PSI 3quater | PSI 3bis -2 | PSI 3bis - 6 | PSI 3bis - 9 |
| 15–19 (B0) | PSI 1 | PSI 2 - 2 | PSI 4 | PSI 3bis - 11 | PSI 8 |
| 15–19 (B3) | PSI 2 - 1 | PSI 3 | PSI 5 | PSI 3bis - 12 | VHR PSI - 3 |
| 15–19 (B6) | PSI 1 | PSI 3ter | VHR PSI - 2 | PSI 3bis - 13 | PSI 3bis - 1 |
| 15–19 (B9) | VHR PSI - 1 | PSI 3quater | PSI 3bis - 10 | PSI 3bis - 14 | PSI 3bis - 2 |

FIG. 1 illustrates respective matrices 110 of PBCCH blocks 120 in respective instances of a plurality of sets of GPRS multiframes for conventional PSI messages along with VHR PSI messages according to some embodiments of the present invention. According to the illustrated embodiments, two PBCCH blocks 120 are divided to form a Shared PSI block 140 which are used to send VHR PSI messages. A complete set of VHR payload information ABC is transmitted in a portion of each Shared PSI block 140 along with successive portions of HR payload information $AA_{1/2}$ and $AA_{2/2}$. The remaining portions of the sequence of HR messages BB, CC, DD, . . . , GG, HH are transmitted in PBCCH blocks 120 between transmissions of the VHR PSI messages sent in the Shared PSI block 140. According to some embodiments, portions of the LR PSI message sequence AAA, BBB, CCC, DDD are successively transmitted upon completion of a full set of HR PSI messages which includes 2 VHR PSI messages sent within the HR PSI message space. According to this example, VHR PSI messages are transmitted twice per matrix 110, a complete set of HR messages are transmitted once per matrix 110, and a complete set of LR messages are transmitted once per every two matrices 110.

FIG. 2 illustrates respective matrices 210 of PBCCH blocks 220 in which four of the PBCCH blocks 220 are divided to form shared PSI blocks 240. Complete VHR payload ABC is transmitted in a portion of each shared PSI block 240 along with successive portions of HR payload information $AA_{1/4}$, $AA_{2/4}$, $AA_{3/4}$, $AA_{4/4}$. The remaining portions of the sequence of HR messages BB, CC, DD, . . . , GG, HH are transmitted in PBCCH blocks 220 between transmissions of the VHR PSI messages sent in the shared PSI blocks 240. Portions of the LR message sequence AAA, BBB, CCC, DDD are successively transmitted upon completion of a full set of HR PSI messages which includes 4 VHR PSI messages sent within HR PSI message space. According to this example, VHR PSI messages are transmitted four times per matrix 210, a complete set of HR messages are transmitted once per matrix 210, and a complete set of LR messages are transmitted once per every four matrices 210.

It will be appreciated that the embodiments of FIGS. 1 and 2 are provided for purposes of illustration, and that the present invention is not limited to such embodiments. For example, the number of messages, periodicity and relative time positions of the message sequences shown in FIGS. 1 and 2 may be varied within the scope of the present invention.

FIG. 3 illustrates a base station 310 and wireless communication terminal 320 that transmit and receive, respectively, VHR PSI messages according to embodiments of the present invention. The base station 310 includes a transmitter 312 that is connected to receive VHR, HR, and LR PSI messages from a scheduler and to transmit these messages from a base station antenna 314 over a Packet Broadcast Control Channel (PBCCH). It will be appreciated that the scheduler and transmitter 312 may be co-located with the base station 310, e.g., at a base station site, or may be resident elsewhere in the wireless communication system of which the base station 310 is a node.

The transmitted VHR PSI messages are received over the PBCCH by a complementary receiver 322 of the wireless terminal 320 via an antenna 326. The receiver 322 provides decoded PSI messages to a controller 324, which causes the wireless terminal 320 to operate in response to the packet system broadcast information contained therein. The operation states include, but are not limited to, the conventional processes for selection of a cell, cell re-selection, and enabling packet data services. If the received PSI message format, such as indicated message type, is incorrect then the PSI message may be ignored. The controller 324 responds to either explicit information in the PSI message or implicit information on the VHR message count and knowledge of the spacing of the VHR messages to predict when the next occurrence of a VHR message will happen. The wireless terminal 320 may include, but is not limited to, a cellular telephone, wireless personal digital assistant (PDA), laptop computer with a wireless networking card, or other electronic device capable of wireless communication.

It will appreciated that the present invention may be implemented as methods, including, but not limited to, methods of operating a wireless mobile packet data communications system, methods of operating a wireless base station, and methods of operating a wireless terminal. It also will be understood that the present invention may be embodied in apparatus, including, but not limited to, wireless packet data communications systems, wireless base stations, wireless terminals, modules for use in wireless base stations and/or terminals, and ASICs for use in wireless terminals. It will be further appreciated that the present invention may be embodied as computer program products configured to be executed in an apparatus such as a wireless base station or a wireless terminal, such that apparatus and/or acts according to the invention may be provided.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A method of operating a General Packet Radio Service (GPRS) wireless mobile system, the method comprising: transmitting first and second classes of broadcast information having different repetition rates in repetitive shared blocks of a Packet Broadcast Control Channel (PBCCH), wherein the transmitting first and second classes of broadcast information comprise: transmitting the broadcast information of the first class at a first repetitive rate; and transmitting the broadcast information of the second class at a second repetitive rate which is less than the first repetitive rate.

2. A method according to claim 1, further comprising the step of:
transmitting a third class of broadcast information having a third repetitive rate which is less than the second repetitive rate.

3. A method according to claim 1, wherein the transmitting first and second classes of broadcast information comprises:
transmitting the same sequence of broadcast information of the first class with successive portions of a sequence of broadcast information of the second class in the shared blocks of the PBCCH.

4. A method according to claim 3, further comprising the step of:
transmitting successive portions of the sequence of broadcast information of the second class in blocks between the repetitive shared blocks.

5. A method according to claim 1, wherein the transmitting first and second classes of broadcast information comprises:
transmitting the first and second classes of broadcast information in shared blocks which are about evenly spaced apart within the PBCCH.

6. A method according to claim 1, wherein the transmitting first and second classes of broadcast information comprises:
transmitting an identifying portion in the shared block which is formatted consistent with the broadcast information of the second class.

7. A method according to claim 1, wherein the transmitting first and second classes of broadcast information comprises:
transmitting an identifier message which indicates the volume of broadcast information of the first class in the sequence which is transmitted in the shared block.

8. A method according to claim 7, wherein the transmitting an identifier message comprises:
transmitting an indication of which portion of the sequence of the second class of broadcast information is transmitted in the shared block.

9. A method according to claim 7, wherein the transmitting an identifier message comprises:
transmitting an indication of the volume of second class broadcast information that is in the sequence to be transmitted across more than one shared block.

10. A method of operating a wireless communication system that repetitively transmits broadcast information within blocks having a predetermined bit length in a broadcast control channel, the method comprising: transmitting first and second classes of system broadcast information having different repetition rates on a broadcast control channel such that information of the first class and at least a portion of a information of the second class are transmitted in a single shared block of the broadcast control channel, wherein the transmitting first and second classes of broadcast information comprises: transmitting the broadcast information of the first class at a first repetitive rate; and transmitting the broadcast information of the second class at a second repetitive rate which is less than the first repetitive rate.

11. A method according to claim 10, further comprising the step of:
transmitting a third class of broadcast information having a third repetitive rate which is less than the second repetitive rate.

12. A method according to claim 10, wherein the transmitting first and second classes of broadcast information comprises:

transmitting the same sequence of broadcast information of the first class with successive portions of a sequence of broadcast information of the second class in the shared blocks of the broadcast control channel.

13. A method according to claim 12, further comprising the step of:
transmitting successive portions of the sequence of broadcast information of the second class in blocks sent between the shared blocks.

14. A method according to claim 10, wherein the transmitting first and second classes of broadcast information comprises:
transmitting the first and second classes of broadcast information in shared blocks which are about evenly spaced apart within the broadcast control channel.

15. A method according to claim 10, wherein the transmitting first and second classes of broadcast information comprises:
transmitting an identifying portion in the shared block which is formatted consistent with the broadcast information of the second class.

16. A method according to claim 10, wherein the transmitting first and second classes of broadcast information comprises:
transmitting an identifier message which indicates the volume of broadcast information of the first class in the sequence which is transmitted in the shared block.

17. A method according to claim 16, wherein the transmitting an identifier message comprises:
transmitting an indication of which portion of the sequence of the second class of broadcast information which is transmitted in the shared block.

18. A method according to claim 16, wherein the transmitting an identifier message comprises:
transmitting an indication of the volume of second class broadcast information that is in the sequence to be transmitted across more than one shared block.

19. A method of operating a General Packet Radio Service (GPRS) wireless terminal, the method comprising: receiving first and second classes of broadcast information having different repetition rates in repetitive shared blocks sent on a Packet Broadcast Control Channel (PBCCH); and operating the wireless terminal in response to the first and second classes of broadcast information, wherein the receiving first and second classes of broadcast information comprises: receiving the broadcast information of the first class at a first repetitive rate; and receiving the broadcast information of the second class at a second repetitive rate which is less than the first repetitive rate.

20. A method according to claim 19, further comprising the steps of:
receiving a third class of broadcast information having a third repetitive rate which is less than the second repetitive rate; and
operating the wireless terminal in response to the third class of broadcast information.

21. A method according to claim 19, wherein the receiving first and second classes of broadcast information comprises:
receiving the same sequence of broadcast information of the first class with successive portions of a sequence of broadcast information of the second class in the shared blocks of the PBCCH.

22. A method according to claim 21, further comprising the step of:
receiving successive portions of the sequence of broadcast information of the second class in blocks sent between the shared blocks.

23. A method according to claim 19, wherein the receiving first and second classes of broadcast information comprises:
receiving the first and second classes of broadcast information in shared blocks which are about evenly spaced apart within the PBCCH.

24. A method of operating a wireless terminal in a wireless communication system that repetitively transmits broadcast information within blocks having a predetermined bit length in a broadcast control channel, the method comprising: receiving first and second classes of broadcast information having different repetition rates in a shared block of the broadcast control channel; and operating the wireless terminal in response to the first and second classes of broadcast information, wherein the receiving first and second classes of broadcast information comprises: receiving the broadcast information of the first class at a first repetitive rate; and receiving the broadcast information of the second class at a second repetitive rate which is less than the first repetitive rate.

25. A method according to claim 24, further comprising the step of:
receiving a third class of broadcast information having a third repetitive rate which is less than the second repetitive rate; and
operating the wireless terminal in response to the third class of broadcast information.

26. A method according to claim 24, wherein the receiving first and second classes of broadcast information comprises:
receiving the same sequence of broadcast information of the first class with successive portions of a sequence of broadcast information of the second class in the shared blocks of the broadcast control channel.

27. A method according to claim 26, further comprising the step of:
receiving successive portions of the sequence of broadcast information of the second class in blocks sent between the shared blocks.

28. A method according to claim 24, wherein the receiving first and second classes of broadcast information comprises:
receiving the first and second classes of broadcast information in shared blocks which are about evenly spaced apart within the broadcast control channel.

29. A base station of a General Packet Radio Service (GPRS) system, the base station comprising: a transmitter operative to transmit first and second classes of broadcast information having different repetition rates in repetitive shared blocks of a Packet Broadcast Control Channel (PBCCH), wherein the transmitter is operative to transmit the broadcast information of the first class at a first repetitive rate and to transmit the broadcast information of the second class at a second repetitive rate which is less than the first repetitive rate.

30. A base station according to claim 29, wherein the transmitter is operative to transmit a third class of broadcast information having a third repetitive rate which is less than the second repetitive rate.

31. A base station according to claim 29, wherein the transmitter is operative to transmit the same sequence of broadcast information of the first class with successive portions of a sequence of broadcast information of the second class in the shared blocks of the PBCCH.

32. A base station according to claim 31, wherein the transmitter is operative to transmit successive portions of the sequence of broadcast information of the second class in blocks sent between the shared blocks of the PBCCH.

33. A base station according to claim 29, wherein the transmitter is operative to transmit the first and second classes of broadcast information in shared blocks which are about evenly spaced apart within the PBCCH.

34. A base station for a wireless communication system, the base station comprising: a transmitter operative to repetitively transmit first and second classes of broadcast information having different repetition rates on a broadcast control channel such that broadcast information of the first class and at least a portion of broadcast information of the second class are transmitted in a single shared block of the broadcast control channel, wherein the transmitter is operative to transmit the broadcast information of the first class at a first repetitive rate and to transmit the broadcast information of the second class at a second repetitive rate which is less than the first repetitive rate.

35. A base station according to claim 34, wherein the transmitter is operative to transmit a third class of broadcast information having a third repetitive rate which is less than the second repetitive rate.

36. A base station according to claim 34, wherein the transmitter is operative to transmit the same sequence of broadcast information of the first class with successive portions of a sequence of broadcast information of the second class in the shared blocks of the broadcast control channel.

37. A base station according to claim 36, wherein the transmitter is operative to transmit successive portions of the sequence of broadcast information of the second class in blocks sent between the shared blocks of the broadcast control channel.

38. A base station according to claim 34, wherein the transmitter is operative to transmit the first and second classes of broadcast information in shared blocks which are about evenly spaced apart within the broadcast control channel.

39. A base station according to claim 34, wherein the transmitter is operative to transmit portions of the sequence of broadcast information of the second class in blocks which are not shared with the first class of broadcast information.

40. A wireless terminal for use in a wireless communication system that repetitively transmits broadcast information on a broadcast control channel, the wireless terminal comprising: a receiver operative to receive first and second classes of broadcast information having different repetition rates in shared blocks of the broadcast control channel; and a controller which operates the wireless terminal in response to the first and second classes of broadcast information to change operational states of the wireless terminal, wherein the receiver is operative to receive the broadcast information of the first class at a first repetitive rate and to receive the broadcast information of the second class at a second repetitive rate which is less than the first repetitive rate.

41. A terminal according to claim 40, wherein:
the receiver is operative to receive a third class of broadcast information having a third repetitive rate which is less than the second repetitive rate; and
the controller changes operates the wireless terminal in response to the third class of broadcast information to change an operational state in the wireless terminal.

42. A terminal according to claim 40, wherein the receiver is operative to receive the same sequence of broadcast information of the first class with successive portions of a sequence of broadcast information of the second class in the shared blocks of the broadcast control channel.

43. A terminal according to claim 42, wherein the receiver is operative to receive successive portions of the sequence of broadcast information of the second class in blocks sent between the shared blocks.

44. A terminal according to claim 40, wherein the receiver is operative to receive the first and second classes of broadcast information in shared blocks which are about evenly spaced apart within the broadcast control channel.

45. A computer program product comprising computer-readable program code embodied in a computer-readable program storage medium, the computer-readable program code executed by a computer processor comprising: program code for causing a radio transmitter to periodically transmit first and second classes of broadcast information at different repetition rates in repetitive shared blocks of a Packet Broadcast Control Channel (PBCCH) of a General Packet Radio Service (GPRS) wireless mobile data communications system, wherein the program code is operative to cause the radio transmitter to transmit the first class of broadcast information at a higher repetitive rate than the second class of broadcast information.

46. A computer program product according to claim 45, wherein the program code is operative to cause the radio transmitter to transmit a third class of broadcast information at a lower repetitive rate than the second class of broadcast information.

47. A computer program product according to claim 45, wherein the program code is operative to cause the radio transmitter to transmit the same sequence of broadcast information of the first class with successive portions of a sequence of broadcast information of the second class in the shared blocks of the PBCCH.

48. A computer program product according to claim 45, wherein the program code is operative to cause the radio transmitter to transmit the first and second classes of broadcast information in shared blocks which are about evenly spaced apart within the PBCCH.

49. A computer program product comprising computer-readable program code embodied in a computer-readable program storage medium, the computer-readable program code executed by a computer processor comprising: receiving program code for causing a radio receiver to periodically receive first and second classes of broadcast information at different repetition rates in repetitive shared blocks of a Packet Broadcast Control Channel (PBCCH) of a General Packet Radio Service (GPRS) wireless mobile data communications system; and controller program code for causing a wireless terminal to operate in response to the first and second class of received broadcast information, wherein the receiving program code is operative to cause the radio receiver to receive the first class of broadcast information at a higher repetitive rate than the second class of broadcast information.

50. A computer program product according to claim 49, wherein:
the receiving program code is operative to cause the radio receiver to receive a third class of broadcast information at a lower repetitive rate than the second class of broadcast information; and
the controller program code is operative to cause the wireless terminal to operate in response to the third class of received broadcast information.

51. A computer program product according to claim 49, wherein the receiving program code is operative to cause the radio receiver to receive the same sequence of broadcast information of the first class with successive portions of a sequence of broadcast information of the second class in the shared blocks of the PBCCH.

52. A computer program product according to claim 49, wherein the receiving program code is operative to cause the radio receiver to receive the first and second classes of broadcast information in shared blocks which are about evenly spaced apart within the PBCCH.

* * * * *